United States Patent [19]
Sievertsen et al.

[11] Patent Number: 6,068,267
[45] Date of Patent: May 30, 2000

[54] TAPERED PART TURNING APPARATUS

[75] Inventors: Karl Sievertsen, Rockton; Richard L. Edwards, Byron, both of Ill.

[73] Assignee: Rockford Products Corporation, Rockford, Ill.

[21] Appl. No.: 09/322,391

[22] Filed: May 28, 1999

[51] Int. Cl.[7] .................................................. B23B 31/117
[52] U.S. Cl. ........................... 279/145; 82/165; 279/103; 279/137
[58] Field of Search .................................... 279/103, 137, 279/143, 145; 82/165

[56] References Cited

U.S. PATENT DOCUMENTS

| | | | |
|---|---|---|---|
| 1,469,833 | 10/1923 | Hanson | 82/165 |
| 1,849,539 | 3/1932 | Branigan | 82/165 |
| 1,885,224 | 11/1932 | Brinkman et al. | |
| 2,297,106 | 9/1942 | Le Tourneau | 82/165 |
| 2,585,510 | 2/1952 | Smith | 279/137 |
| 3,626,794 | 12/1971 | Seethaler | |
| 3,910,476 | 10/1975 | Zajac | |
| 4,130,289 | 12/1978 | Zajac et al. | |
| 5,701,779 | 12/1997 | Carter | |

FOREIGN PATENT DOCUMENTS 1366310  1/1988  U.S.S.R. ................................ 279/137

OTHER PUBLICATIONS

Springett, David. "Woodturning Wizardry" (Lewes, East Sussex, England: Guild of Master Craftsman Publications), pp. 10–11, 1993.

U.S. Pat. application Ser. No. 09/332,691, including Figure 1 therein and corresponding description thereof on pp. 1–2.

*Primary Examiner*—Steven C. Bishop
*Attorney, Agent, or Firm*—McDermott, Will & Emery

[57] ABSTRACT

A turning apparatus for a CNC or other turning machine comprises a faceplate having a locating insert secured and located therein for locating a part on a taper thereof. The turning apparatus clamps and draws the part into the locating insert to facilitate machining of the part. The insert is readily replaceable to accommodate a part having a different taper.

23 Claims, 4 Drawing Sheets

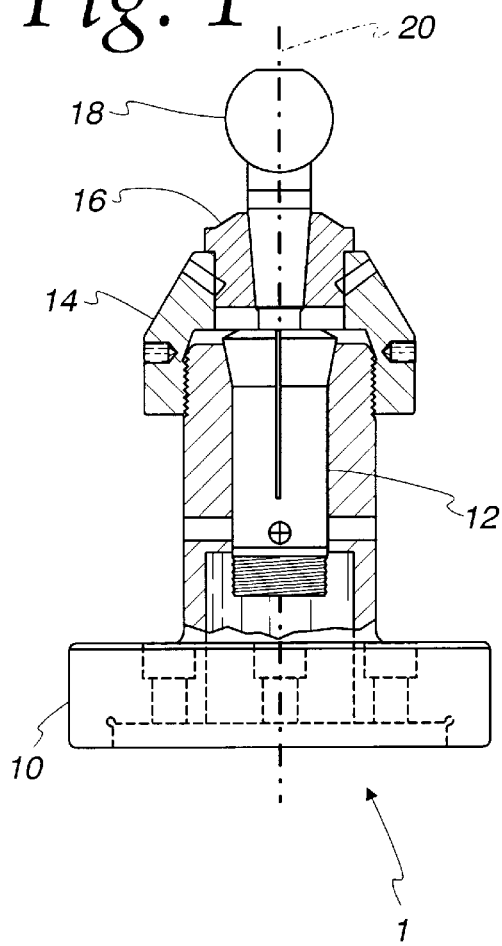
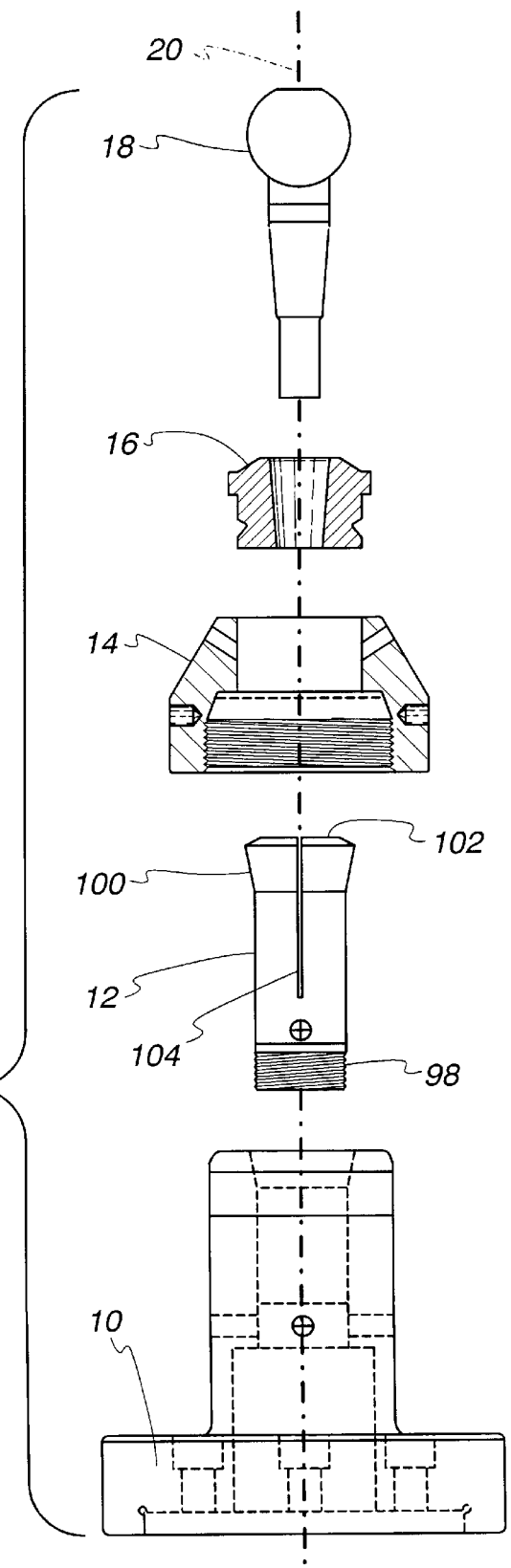

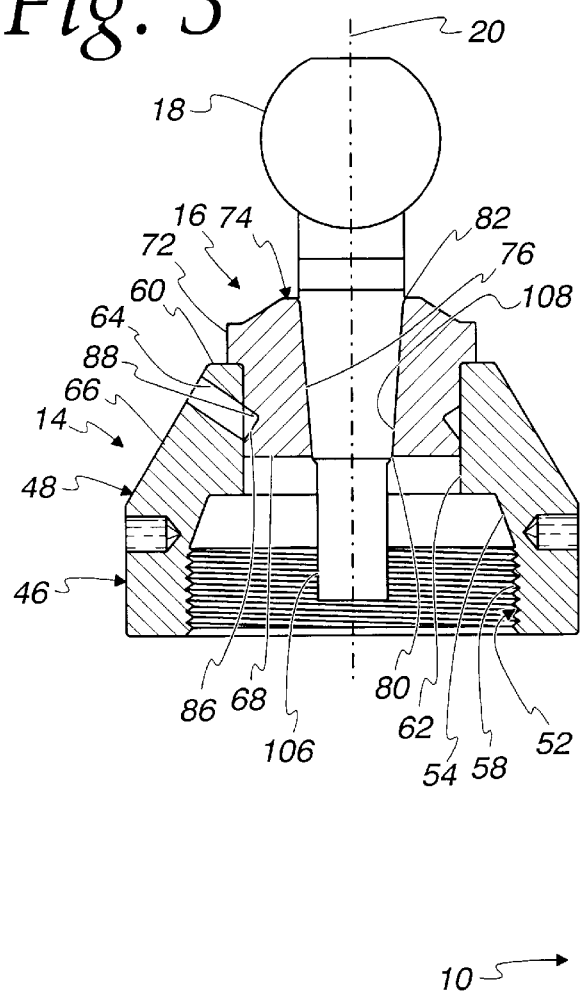
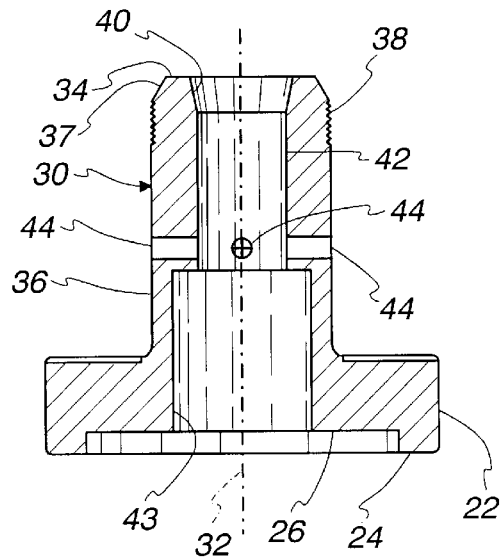
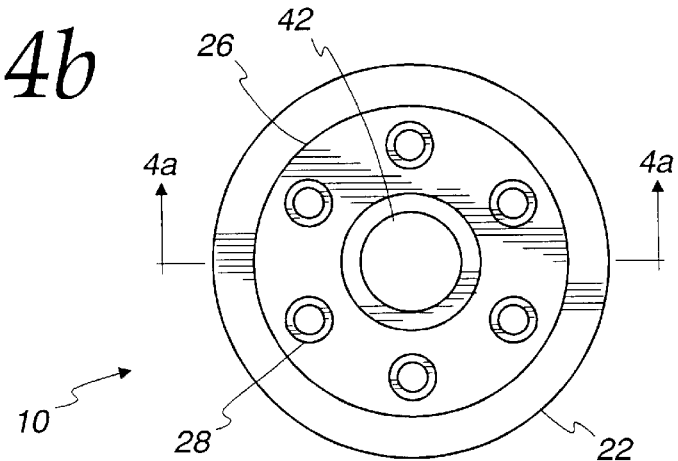

TAPERED PART TURNING APPARATUS

FIELD OF THE INVENTION

The present invention relates generally to a turning apparatus; particularly to a turning apparatus configured to locate tapered parts.

BACKGROUND OF THE INVENTION

The use of lathes has long been known for machining axially symmetrical portions of parts of all types. Simply stated, a lathe is operated by fixing, or chucking, a part into the machine. Once chucked, the lathe is powered to rotate the part and a cutting tool is brought into contact with the rotating part to remove material therefrom. Movement of the part within the chuck would halt the process and damage the tool and/or machine. Therefore, a solid grasp of the part by the chuck is important to ensure that the part does not move under the force of the cutting tool. It is also important to avoid marring the part with the chucking fixture. Care must be taken to grasp the part only as tight as necessary to obtain proper mounting and machining of the part without marring. This problem becomes especially troublesome when the portion of the part being chucked has already been machined into its final form because marring of that chucked portion would result in a defective part either for reasons of required tolerances or for mere aesthetic reasons.

With the advent of computers and electronic sensing means has come automated cutting machines in which parts are machined according to a preset program defining the path taken by the cutting tool along the turning part. These automated cutting machines are referred to as Computer Numeric Control machines ("CNC machines"). A typical CNC machine will locate the cutting tool, and the cutting path it takes, to the CNC machine itself; not the part. Therefore, it is important that the part is properly chucked in the CNC machine and to properly locate the part with respect to the CNC machine itself. If the part is out of location by, for example, five thousandths of an inch, then the cutting accomplished by the cutting tool will likewise be out of location by five thousandths of an inch. Similarly, because turning machines are used to machine axially symmetric parts, or axially symmetric portions of parts, it is important to align the axis of the part with the rotational axis of the turning fixture and thus the CNC machine. Again, misalignment will result in a defective part. Although CNC machines are capable of producing highly accurate and complex parts, the accuracy of the resulting part is highly dependant upon the proper location of the part to the cutting machine, whether it be a CNC or manually operated.

A special problem often arises when the part comprises a taper on or near the portion of the part which facilitates chucking or locating of the part. Traditional chucking fixtures intended for non-tapered parts often mar the tapered surface and typically present great difficulties in properly locating the part with respect to the cutting machine. The industry thus turned to tapered collets custom machined to chuck on the taper of the part. The collet taper also functioned to locate the part. However, because these collets were custom machined for a specific angle of taper, they were only useful for parts having a taper of that specific angle. Therefore, if a run of parts required identical machining and the parts were identical in every way except for the taper on which they would be located, a separate collet would have to be precision machined for each different taper. Portions of the fixture were disassembled to remove the collet and reasembled to employ a different collet each time a part having a different taper was to be machined. Moreover, because a collet holds the part, a job specific collet must clamp onto the taper of the part with sufficient force to prevent relative movement there between during the cutting process. Marring of the tapered surface would often result. Additionally, the collets wore after extended use such that the part location would change with respect to the turning machine. Parts located by such a worn collet during machining would be defective.

SUMMARY OF THE INVENTION

It is one of the principal objectives of the present invention to provide a turning apparatus capable of accurately locating tapered parts.

It is another objective of the present invention to provide a turning apparatus capable of locating parts with minimal wear to the turning apparatus and without marring the parts.

It is another objective of the present invention to provide a turning apparatus which does not clamp on a taper of the part.

It is still another objective of the present invention to provide a turning apparatus which is capable locating a part on a taper thereof and capable of being quickly reconfigured to machine parts having a different taper configuration.

BRIEF DESCRIPTION OF DRAWINGS

FIG. 1 is a cross sectional view of one embodiment of the turning apparatus of the present invention with a part chucked therein.

FIG. 2 is an exploded cross sectional view of the turning apparatus of FIG. 1.

FIG. 3 is a cross sectional view of the faceplate and insert of the turning apparatus of FIG. 1 with a part chucked therein.

FIG. 4A is a cross sectional view of the spindle nose of the turning apparatus of FIG. 1.

FIG. 4B is a mount side axial view of the spindle nose of FIG. 4A.

DETAILED DESCRIPTION OF THE DRAWINGS

Figure 5A:
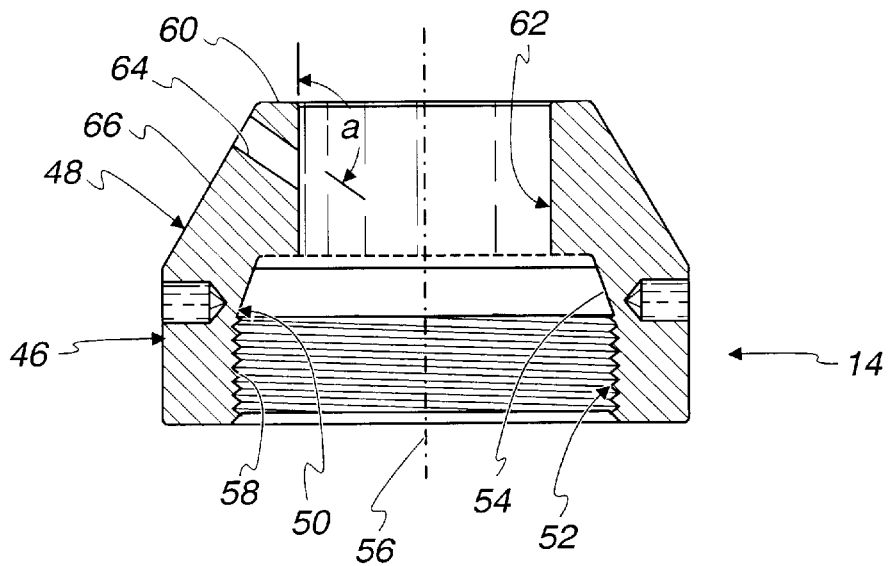
FIG. 5A is a cross sectional view of the faceplate of the turning apparatus of FIG. 1.

In one embodiment of the present invention depicted in FIGS. 1 and 2, a turning apparatus 1 comprises a spindle nose 10 for mounting to a CNC (not depicted), or other turning machine, which houses a collet 12 and a draw mechanism (not depicted) operatively connected to the collet 12. A faceplate 14 is mounted to the spindle nose 10 and accepts a locating insert 16 therein for locating a part 18 to facilitate machining thereof. The spindle nose 10, the collet 12, the faceplate 14, the locating insert 16 and the part 18 are each axially aligned along an axis of rotation 20 of the turning apparatus 1.

The spindle nose 10 depicted in FIGS. 4A and 4B comprises a mount end 22, depicted as an annular disk, with a mounting face 24 having a relief 26 therein and a plurality of mounting holes 28 extending from the relief 26 through the mount end 22 as required to affix the turning apparatus 1 of the present invention to a CNC or other turning machine. A nose 30 extends outward from the mount end 22 forming a cylinder about a central axis 32 of the spindle nose 10 terminating in a spindle nose free end 34 which comprises an external chamfer 37 between the free end 34 and an outer surface 36 of the nose 30 to assist in locating the faceplate 14 over the free end 34. A series of mounting threads 38 extend from the chamfer 37 along the outer surface 36 of the nose 30 to allow the faceplate 14 to be threaded thereon. While threads are the depicted manner of securing the faceplate 14 onto the spindle nose 10, other manners of attachment, as are known in the art, are contemplated. A collet contraction surface 40 extends inward of the nose free end 34 at an angle to a collet bore 42 which extends about the central axis 32 of the spindle nose 30 to a draw mechanism bore 43 extending inward from the relief 26 in the mount end 22. The collet bore 42 is depicted as cylindrical to accommodate a standard collet 12. Other configurations are contemplated. The collet bore 42 is shorter than the collet 12 to be used therein so that a threaded end of the collet 12 will extend out of the collet bore 42 and into the draw mechanism bore 43 which houses the draw mechanism to facilitate securing the collet 12 to the draw mechanism. The collet bore 42 can be configured other than as shown as is necessary to accept collets of other configurations, consistent with the present invention. Alternatively, the draw mechanism may be configured to extend into the collet bore 42 to engage the collet 12. One or more keyholes 44 may extend through the nose 30 from the nose outer surface 36 to the collet bore 42. Locking elements, such as screws, are advanced into the keyholes 44 to assist in locking the collet 12 within the spindle nose 10 as described in more detail below. While the description herein relates to the spindle nose depicted in the figures, other spindle nose configurations consistent with the present invention are also contemplated.

Figure 5B:
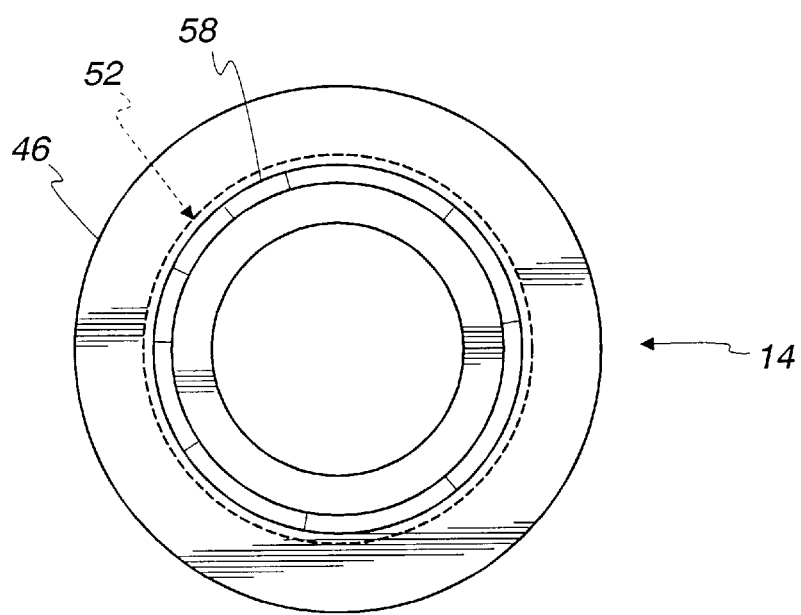
FIG. 5B is a left side axial view of the faceplate of FIG. 5A.

The faceplate 14 depicted in FIGS. 5A and 5B comprises an annular base 46 and an annular nose 48 extending therefrom. The annular base 46 has a bore 50 extending therein wherein a first portion 52 of the bore 50 is threaded with mounting threads 58 and a second portion 54 of the bore 50 is angled radially inward toward the central axis 56 of the faceplate 14. The mounting threads 58 on the bore first portion 52 complement the mounting threads 38 on the nose outer surface 36 of the spindle nose 10 so that the faceplate 14 may be threaded onto the spindle nose 10 as discussed in more detail below. The radial angle of the bore second portion 54 complements the spindle nose external chamfer 37 so they will mate upon assembling the faceplate 14 onto the spindle nose 10, as discussed in more detail below and shown in FIG. 1, and assist in locating the faceplate 14 with respect to the spindle nose 10. The faceplate annular nose 48 comprises a face 60 and a locating insert bore 62 extending inward from the face 60 to the annular base bore 50 such that bores 50 and 62 constitute a through bore along the central axis 56 of the faceplate 14. The locating insert bore 62 is configured to accept the locating insert 16 as depicted in FIGS. 1 and 3. To ensure that the central axis 78 of the locating insert 16 is substantially collinear with the faceplate central axis 56, and thus the rotational axis 20 of the turning apparatus 1, the tolerances of the locating insert bore 62 should be substantially low; one thousandths of an inch for example. The faceplate annular nose 48 further comprises a locking element bore 64 constituting a through bore from an annular nose outer surface 66 to the locating insert bore 62 to accept a locking element for detachably securing the locating insert 16 within the faceplate 14 as described in greater detail below. Other faceplates capable of interchangeably securing the insert 16 of the present invention are also contemplated.

Figure 6A:
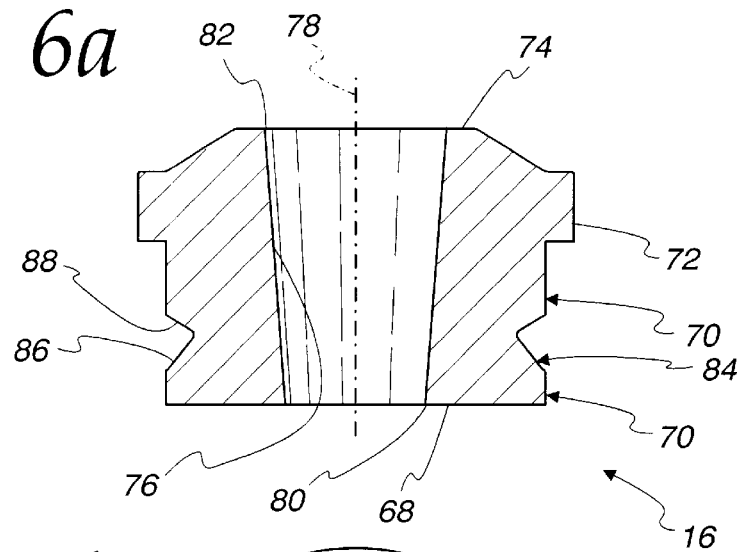
FIG. 6A is a cross sectional view of the locating insert of the turning apparatus of FIG. 1.
Figure 6B:
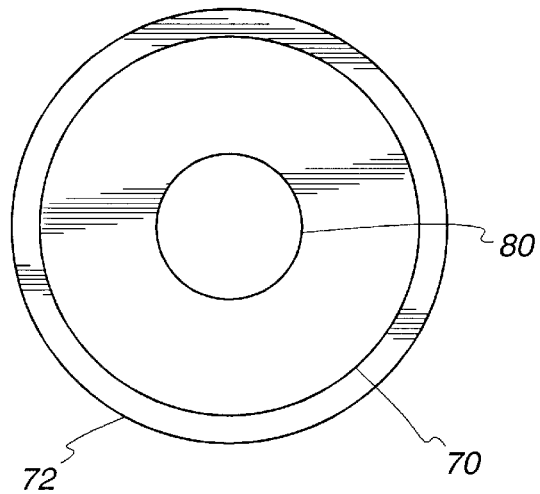
FIG. 6B is a left side axial view of the locating insert of FIG. 6A.

The locating insert 16 comprises a rear face 68 terminated by an annular outer locating surface 70 extending from the rear face 68 to an outer boss 72. The outer boss extends to a leading face 74. A locating bore 76 extends about an insert central axis 78 from the rear face 68 to the leading face 74 to constitute a through bore. The insert locating bore 76 forms a rear diameter 80 in the rear face 68 as well as a leading diameter 82 in the leading face 74. The leading diameter 82 is larger than the rear diameter 80 so that the insert locating bore 76 forms a taper from the leading face 74 to the rear face 68. In the embodiment of the locating insert 16 depicted in FIGS. 6A and 6B, the taper from the leading face 74 to the rear face 68 is a constant taper; there is no step in the taper of the insert locating bore 76. The taper of insert locating bore 76 is designed to complement the taper of the part 18 to be mounted in the turning apparatus 1 of the present invention. When the part 18 is placed into the insert locating bore 76, the tapered portion of the part 18 will come into contiguous contact with the insert locating bore 76 preventing the part 18 from further travel into the locating insert 16. The distance which the part 18 will travel into the locating insert 16 is regulated by the front diameter 82 of the locating bore 76. By configuring the front diameter 82 to be marginally smaller than the largest diameter on the taper of the part 18, the taper of the part 18 may be prevented from traveling further into the turning apparatus 1 than the locating insert 16. In one embodiment, the locating insert 16 is as long as the taper of the part 18 so that the entire taper will be accommodated by the locating insert 16 as depicted in FIGS. 1 and 3. Accommodation of the entire taper is not necessary however for proper operation of the present invention.

The insert outer locating surface 70 has an annular groove 84 located therein. The locating insert 16 is configured so that when the insert outer boss 72 is pressed flush against the faceplate face 60, the insert annular groove 84 will align with the faceplate locking element bore 64 so that a locking element (not depicted) can readily be inserted through the faceplate locking element bore 64 and into the insert annular groove 84. The locking element may be a screw or other element which can readily be removed after locking the locating insert 16 into the faceplate 14 and, later, again reinserted to lock the same, or another, locating insert 16 within the faceplate 14. Other means of securing the locating insert 16 within the faceplate locking element bore 64, such as a press fit, are contemplated.

To this end, the faceplate locking element bore 64 is set at an angle (a) relative to the faceplate central axis 56 (angle (a) is depicted in FIG. 5A as relative to the faceplate locating element bore 62 which is parallel to the faceplate central axis 56). The faceplate locking element bore 64 is depicted as normal to the outer surface 66 of the faceplate annular nose 48 to ease the insertion of the locking element therein. However, insertion of the locking elements may be accomplished at other angles. The annular groove 84 comprises an abutting surface 86 and a guiding surface 88. The abutting surface 86 is depicted at an angle from the insert central axis 78 which is supplemental to the angle (a) of the faceplate locking element bore 64 so that the locking element will make flush contact with the abutting surface 86 of the insert annular groove 84 when the locking element is inserted through the faceplate locking element bore 64. Thus configured, any forces attempting to extract the locating insert 16 from the faceplate 14 will be absorbed by the locking element as a tolerable mix of both shear and compressive forces thereon; the ratio of which will depend on the angle (a) which may be altered for this purpose as will be recognized by one of ordinary skill in the art. Therefore, with the locking element holding the insert boss 72 against the faceplate face 60, the locating insert 16 is firmly secured within the faceplate 14 and is not susceptible of movement.

Figure 7:
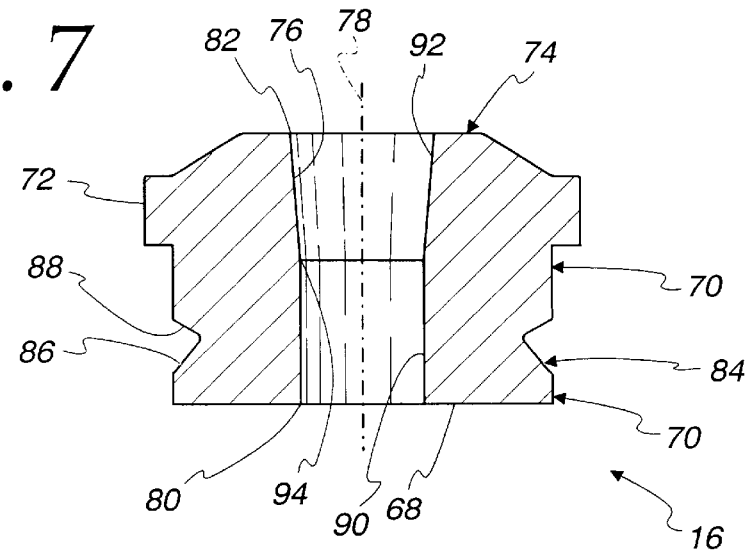
FIG. 7 is a cross sectional view of another locating insert of the present invention.

The locating insert 16 of the present invention is capable of accommodating parts having any taper or even varying, or stepped, tapers by simply varying the rear and leading diameters 80, 82 of insert locating bore 76 and/or the taper there between as will be appreciated by one of ordinary skill in the art. For example, the locating insert 16 depicted in FIG. 7 comprises a locating bore 76 of a stepped configuration having a first locating bore portion 90 and a second locating bore portion 92. The first locating bore portion 90 is of a constant diameter equal to the rear diameter 80 and extending from the rear diameter 80 to an intermediate diameter 94 of equal size to the rear diameter 80. Because the leading diameter 82 is larger than the intermediate diameter 94 the second locating bore portion 92 comprises a taper configured to conform to the part 18 which the locating insert 16 is intended to accept. In another contemplated embodiment (not depicted), the intermediate diameter 94 is larger than the rear diameter 80 and smaller than the leading diameter 82 such that the insert locating bore 76 comprises two tapers of different degree. The insert locating bore 76 is susceptible of any configuration to accommodate a part 18 therein and the configuration of the insert locating bore 76 is only to be limited as expressly done in the claims.

The insert locating bore 76 is precision machined to assure proper dimensioning as well as an even taper, or tapers for locating inserts 16 comprising multiple tapers. Precision machining can be accomplished by any known method. It has been found, however, that precision grinding within a tolerance range of +/−0.0005 inch from the dimensions of the taper on the part 18 provides an acceptable insert locating bore 76. To insure proper location of the part 18, the insert outer locating surface 70 may also be machined to tight tolerances. In one embodiment, the insert outer locating surface 70 is machined within a tolerance range of +/−0.0005 inch. Once precision machining is complete, the insert locating bore 76 is hardened to maintain the precision dimensions. Hardening can be accomplished by any known method. It has been found, however, that a carbonizing process used to provide the locating insert bore 76 with a hardness range of 58–60 HRC will produce an acceptable locating insert 16 capable of extensive use.

Assembly of the turning apparatus 1 comprises mounting the spindle nose 10 onto a turning machine by standard techniques known to those skilled in the art. The collet 12, being of any known configuration, is then inserted into the spindle nose 10 and the collet threads 98 are threaded into complementary threads of the draw mechanism housed within the draw mechanism bore 43. Other known methods of securing the collet 12 to the draw mechanism are also contemplated. An outer flare 100 (FIG. 2) at an open end 102 of the collet 12 rests against the collet contraction surface 40 of the spindle nose 10. Locking elements (not depicted) such as, for example, dog point screws are then inserted through the spindle nose key holes 44 and into a plurality of collet longitudinal slits 104 extending from the open end 102 to prevent rotation of the collet 12 and thus from unscrewing itself from the draw mechanism. Other locking means, such as prevailing torque thread features, as known in the art, are also contemplated for preventing the collet from unscrewing or otherwise disconnecting from the draw mechanism. The faceplate mounting threads 58 are then threaded onto the spindle nose mounting threads 38. The annular outer locating surface 70 of the insert 16 is then inserted into the faceplate locating insert bore 62 until the insert boss 72 abuts against the faceplate face 60. Locking elements, such as screws, are then inserted through the locking element bores 64 to abut against the insert abutting surface 86 thereby securing the insert 16 within the faceplate 14 as discussed above.

The insert 16 within the faceplate 14 may be readily replaced at any time by another insert 16 to allow the turning apparatus 1 to accommodate a part 18 having a different taper. Replacement of the insert 16 is accomplished by removing or loosening the locking elements from the locking element bores 64 in an amount at least sufficient to allow the insert 16 to be slid out of the faceplate locating insert bore 62. The insert 16 is then removed from the faceplate 14 and the replacement insert 16 is inserted into the faceplate locating insert bore 62 until the insert outer boss 72 abuts against the faceplate face 60. The locking elements are then either re-inserted or re-tightened against the abutting surface 86 of the replacement insert 16 to secure it within the faceplate 14. The insert 16 can be replaced as often as necessary and may accommodate any part 18 configuration.

With the turning assembly 1 assembled as described above and as depicted in FIG. 1, a part 18 is inserted into and through the insert locating bore 76 and into the collet front end 102 according to the typical technique of mounting a part within a collet as is known to those of ordinary skill in the art. The draw bar mechanism is then activated to draw the collet 12 along the axis of rotation of the turning apparatus 1 toward the spindle nose mount end 22. As the collet 12 is thus drawn, the collet outer flare 100 encounters the collet contraction surface 40 of the faceplate 10 and constricts the collet front end 102 about the part 18 in the typical manner in which a collet is employed to grasp a part. Once grasped, the part 18 is drawn by the collet 12 back toward the spindle nose mount end 22 bringing the taper of the part 18 into solid contact with the insert locating bore 76. Other means of grasping the part 18 are also contemplated.

In one embodiment of the present invention, the draw mechanism comprises a hydraulic actuator which draws the part 18 back into the insert 16 until the insert 16 provides the part 18 with sufficient resistance to overcome the force of the actuator. The force required to firmly seat the part 18 within the insert locating bore 76 and properly locate the part 18 will depend on the size of the part 18 and will be recognized by one of ordinary skill in the art. This will usually occur when the part taper completely fills the insert locating bore 76 as depicted in FIGS. 1 and 3. Because the insert locating bore 76 is precision ground, the part will be precisely located within the turning apparatus 1 of the present invention. Because the insert front diameter 82 is of a known dimension, the location of the various portions of the part 18 with respect to the turning apparatus 1, as well as the associated turning machine, are easily calculable such that, for example, a CNC machining program could be readily prepared to facilitate proper CNC machining of the intended part 18. Proper location of the part 18 will be repeatedly accomplished over a long life for the insert 16 because, as discussed above, the insert locating bore 76 is hardened and will not readily wear such that the tight tolerances of the insert locating bore 76 will be maintained throughout a long insert life.

It will be recognized by one of ordinary skill in the art that the turning apparatus 1 of the present invention need not clamp on the taper of the part 18 to securely fix the part 18 within the turning apparatus 1. Rather, the part 18 is located by interfacing the insert locating bore 76 with the taper of the part 18. The insert locating bore 76 does not clamp on the part 18.

Additionally, because the insert 16 may be quickly replaced by an insert having a different insert locating bore 76 configuration, a turning machine can be reconfigured to machine different parts with a minimum of down time.

In one embodiment of the present invention, the turning apparatus 1 is employed to turn a tapered ball stud 18 such as that depicted in FIGS. 1–3. In this embodiment a cylindrical end 106 of the ball stud 18 is inserted into and through the insert locating bore 76 and into the collet open end 102. The draw mechanism is then activated and the collet 12 clamps onto the part cylindrical end 106 as it draws backward pulling the part 18 further into the insert 16 until the taper 108 of the part 18 encounters the insert locating bore 76. Once the part taper 108 encounters the insert locating bore 76, the insert 16 will resist further travel of the part 18 until this resistance equals the force exerted by the draw mechanism and the system achieves equilibrium as discussed above. With the part 18 thus properly chucked, the turning machine can be operated to machine the part 18 as needed. Once machining is finished, the draw mechanism advances the collet 12 toward the insert 16 causing the collet 12 to release the part cylindrical end 106 so that the part 18 may be removed and the process repeated for another part 18. Should the next part 18 comprise a taper 108 of a different configuration, then the insert 16 would be replaced as discussed above. Machining would then continue as described above. While the parts 18 depicted in figures represent tapered ball studs, the turning apparatus 1 of the present invention may be employed for the machining of any part comprising a taper, consistent with the present invention.

From the foregoing description, it will be apparent that the turning apparatus of the present invention has a number of advantages, some of which have been described above and others of which are inherent in the apparatus of the present invention. Also, it will be understood that modifications can be made to the apparatus of the present invention without departing from the teachings herein. Accordingly the scope of the invention is only to be limited as necessitated by the accompanying claims.

We claim:

1. An apparatus for mounting a tapered part to a turning machine, the apparatus comprising:
   a faceplate; and
   a locating insert removeably mounted to the faceplate and defining a locating bore comprising a taper for interfacing the taper of the tapered part and locating the tapered part thereon, the locating bore taper being configured to prevent marring of the taper of the tapered part, and the locating bore further comprising a locating bore proximate end and a locating bore distal end configured such that the tapered part extends from the locating insert to allow machining of the tapered part beyond the locating bore distal end.

2. The apparatus of claim 1 wherein the locating bore comprises a through bore.

3. The locating insert of claim 2 wherein the through bore is hardened within the range of 58–60 HRC and precision ground.

4. The apparatus of claim 1 wherein the locating bore taper is configured to be complementary to the taper to the tapered part.

5. The apparatus of claim 1 wherein the locating insert comprises an annular groove for locking with the faceplate.

6. The apparatus of claim 1 wherein the faceplate comprises a locating insert bore for accepting and locating the locating insert with respect to the faceplate.

7. The apparatus of claim 6 wherein the faceplate comprises a locking element for securing the locating insert with respect to the faceplate.

8. The apparatus of claim 1 wherein the tapered part further comprises a non-tapered portion and the locating bore comprises a non-tapered portion.

9. The apparatus of claim 1 further comprising a draw mechanism for maintaining firm contiguous contact between the taper of the tapered part and the locating bore taper.

10. The apparatus of claim 9 wherein the locating bore taper widens from the proximate end to the distal end and the draw mechanism is releasably secured to a proximate end of the tapered part to bias the tapered part toward the locating bore proximate end.

11. The apparatus of claim 9 wherein the apparatus is configured such that only the draw mechanism and the locating bore taper of the apparatus engage the tapered part.

12. An apparatus for mounting a part having a tapered portion with respect to a turning machine, the apparatus comprising:
    a mounting fixture; and
    a draw mechanism for retaining the part within the mounting fixture;
    wherein the draw mechanism is configured to locate the part with respect to the turning machine on the part tapered portion and the draw mechanism retains the part within the mounting fixture without engaging the part tapered portion.

13. The apparatus of claim 12 wherein the draw mechanism is configured to bias the part into a bore of the mounting fixture such that the part tapered portion is drawn into contiguous contact with a taper of the locating bore which is complementary to the taper of the tapered part.

14. The apparatus of claim 12 wherein said mounting fixture comprises a faceplate and an interchangeable locating insert having a tapered locating bore, wherein the locating insert is interchangeably fixed to the faceplate permitting the mounting fixture to alternatively accommodate a locating insert having a different locating bore taper configuration.

15. The apparatus of claim 13 wherein the mounting fixture is configured to cause a portion of the part to protrude beyond the mounting fixture bore to facilitate machining of the protruding portion without interference from the mounting fixture.

16. The apparatus of claim 14 wherein said faceplate comprises a locating insert bore for locating said locating insert with respect to said faceplate and a locking element for interchangeably securing the locating insert to the faceplate.

17. The apparatus of claim 14 wherein the tapered locating bore comprises a precision ground and hardened through bore.

18. The apparatus of claim 12 wherein the draw mechanism comprises a collet.

19. The apparatus of claim 13 wherein the apparatus is configured such that only the draw mechanism and the locating bore taper of the apparatus engage the part.

20. An apparatus for mounting and locating a part having a taper to a turning machine, the apparatus comprising:

a mounting fixture comprising a locating insert having a locating bore comprising a taper wherein the locating insert is configured to center the part on a rotational axis of the turning machine without marring the part taper; and a draw mechanism for selective grasping the part and biasing the part into the locating bore.

21. The apparatus of claim 20 wherein the mounting fixture further comprises a face plate and the locating insert is interchangeably fixed to the face plate permitting the face plate to accommodate a locating insert having a different locating bore taper configuration.

22. The apparatus of claim 21 wherein the draw mechanism is configured to grasp the part on a non-tapered portion to bias the part into the locating bore.

23. The apparatus of claim 20 wherein the apparatus is configured such that only the draw mechanism and the locating bore taper of the apparatus engage the part.

* * * * *